United States Patent

Ohmi

[11] Patent Number: 5,916,457
[45] Date of Patent: Jun. 29, 1999

[54] MATERIAL TO BE WELDED FOR BUTT WELDING, METHODS OF CUTTING AS WELL AS WELDING THE SAME, AND A WIRE

[76] Inventor: Tadahiro Ohmi, 1-17-301, Komegabukuro 2-chome, Aoba-ku, Sendai-Shi. Miyagi-ken, 980, Japan

[21] Appl. No.: 08/737,996

[22] PCT Filed: Jun. 2, 1995

[86] PCT No.: PCT/JP95/01088

§ 371 Date: Apr. 15, 1997

§ 102(e) Date: Apr. 15, 1997

[87] PCT Pub. No.: WO95/33592

PCT Pub. Date: Dec. 14, 1995

[30] Foreign Application Priority Data

Jun. 2, 1994 [JP] Japan ................................. 6-121605

[51] Int. Cl.⁶ ............................. B23H 1/06; B23H 7/08
[52] U.S. Cl. .............................. 219/69.12; 219/105
[58] Field of Search ........................... 228/170, 171; 219/105, 69.12, 69.17

[56] References Cited

U.S. PATENT DOCUMENTS

| | | | |
|---|---|---|---|
| 3,722,778 | 3/1973 | Rohrberg et al. | 219/60 A |
| 3,912,151 | 10/1975 | Martin | 228/171 |
| 4,484,060 | 11/1984 | Frye | 219/137 R |
| 5,152,059 | 10/1992 | Midgley | 228/171 |
| 5,243,167 | 9/1993 | Lundquist et al. | 219/69.12 |
| 5,396,039 | 3/1995 | Chevrel et al. | 219/137 R |
| 5,580,398 | 12/1996 | Ohmi | 148/280 |
| 5,667,133 | 9/1997 | Ohmi et al. | 219/72 |

FOREIGN PATENT DOCUMENTS

| | | | |
|---|---|---|---|
| 57-118830 | 7/1982 | Japan . | |
| 58-192693 | 11/1983 | Japan | 228/171 |
| 61-288932 | 12/1986 | Japan . | |
| 5-38574 | 2/1993 | Japan . | |
| 5-220628 | 8/1993 | Japan . | |
| 6-39543 | 2/1994 | Japan . | |
| 93/10274 | 5/1993 | WIPO . | |
| 93/24267 | 12/1993 | WIPO . | |

*Primary Examiner*—Geoffrey S. Evans
*Attorney, Agent, or Firm*—Randall J. Knuth

[57] ABSTRACT

To provide a material to be welded for butt welding which can reduce contamination of particles into a welded portion after the welding is executed and which can construct piping or a device each enabling realization with high repeatability a ultra-clean atmosphere in which the density of impurity such as moisture or the like is suppressed, and a method of cutting the same. Also to provide a wire used for wire cut electric discharge machine which can prevent reduction of chromium composition in a place adjacent to the welded bead section after the welding is executed. (1) A face to be butted of the material to be welded is cut by a wire cut electric discharge machine. It should be noted that it is preferable that the surface of the wire used for the wire cut electric discharge machine is stainless or chromium and that stainless steel or chromium having a thickness of not less than 0.1 $\mu m$ is deposited on the cut face. (2) As for the method of cutting, at least a face to be butted is cut by the wire cut electric discharge machine. (3) At least the surface of the wire is made of stainless steel or chromium.

17 Claims, 6 Drawing Sheets

Cr COMPOSITION IN THE TOP LAYER SECTION
1/4" SUS316L — $Cr_2O_3$ TREATMENT

FIG. 4
(A)
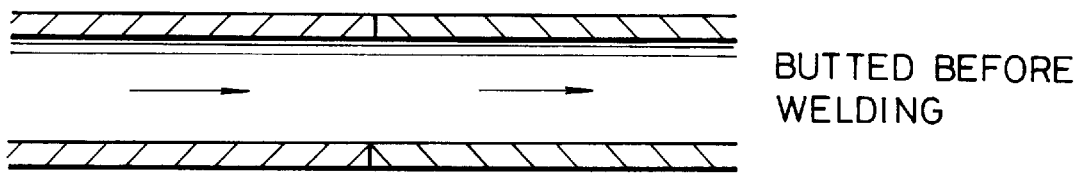
BUTTED BEFORE WELDING
(B)
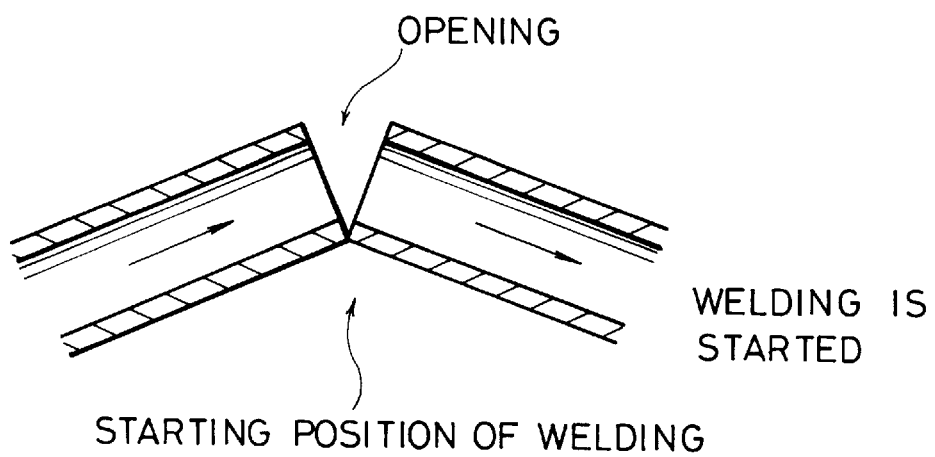
WELDING IS STARTED
(C)
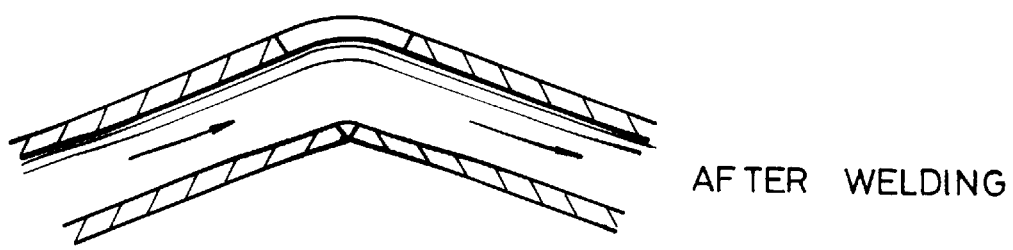
AFTER WELDING

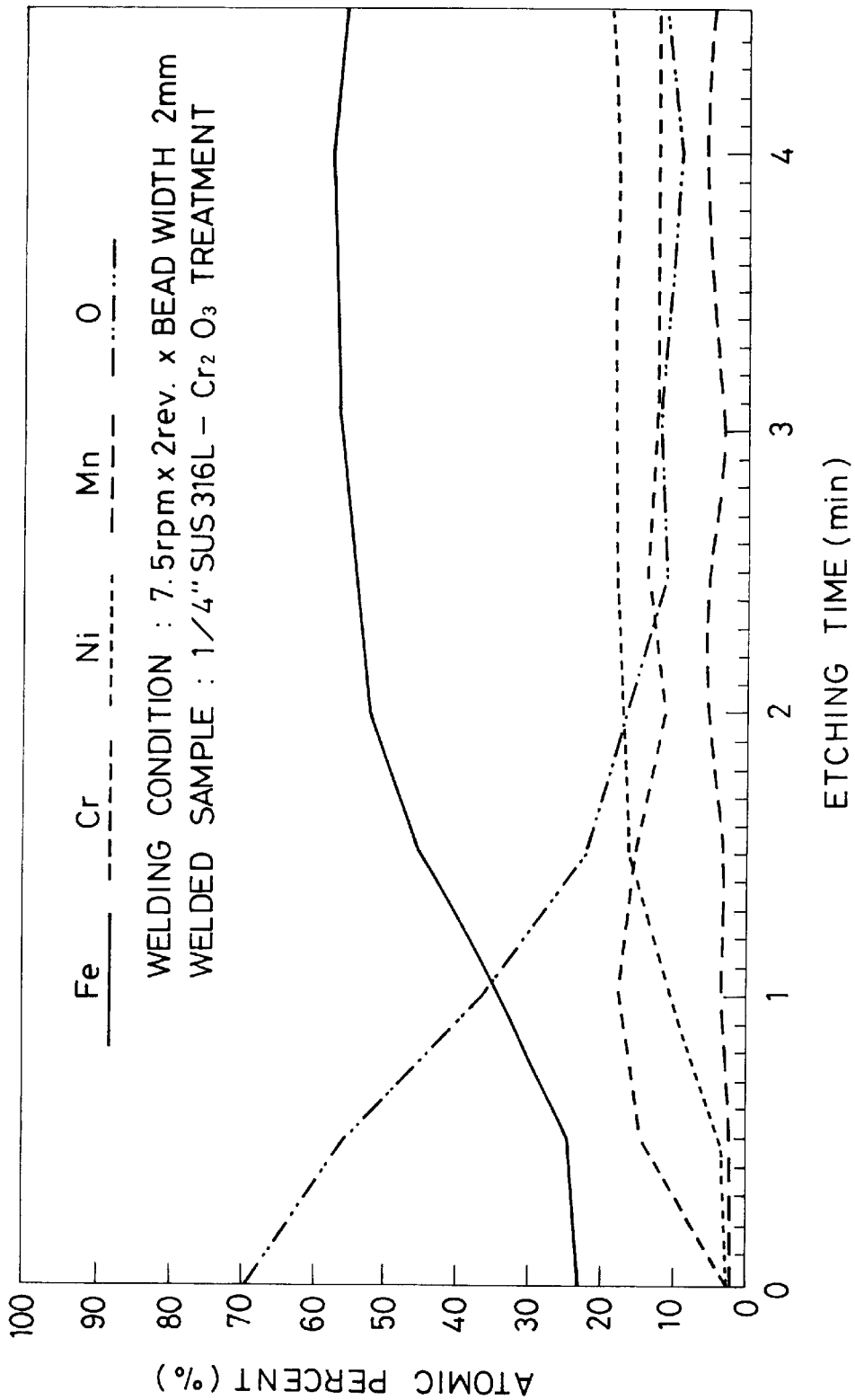

MATERIAL TO BE WELDED FOR BUTT WELDING, METHODS OF CUTTING AS WELL AS WELDING THE SAME, AND A WIRE

FIELD OF THE INVENTION

The present invention relates to a material to be welded for butt welding, a method of cutting the same, a method of welding the same, a wire used for electric discharge machining, a fluid supply piping system, and a process device.

TECHNOLOGICAL BACKGROUND (A) In association with the tendency for higher degree of integration and higher performance in the field of semiconductor devices, there are demands for a manufacturing device which can satisfy the needs, there have been made intensive efforts for creating a higher degree of vacuum and cleaner atmosphere for forming a film.

In order to create an ultra-high degree of vacuum and ultra-clean atmosphere for forming a film, it is required to completely suppress out gas discharged from the manufacturing device (e.g., a process device for forming films or the like) as well as from the internal surface of a fluid supply piping system for gas or the like.

With years of research and development activities by the present inventor, now it is possible to form an oxide passivated-film on a surface of the device or the like containing therein chromium oxide as a main element which is excellent in corrosion resistance and emits only an extremely small amount of out gas therefrom. As a result, the present inventor has succeeded in creating a supply gas as well as an atmosphere for forming a film in which out gas discharged from inside of the device is suppressed to a rate so that the gas is hardly detected by any of current measuring devices. Namely, it is possible to suppress a density of impurities (moisture, hydrocarbons or the like) in the supply gas as well as in the atmosphere for forming a film to not more than the order of ppb and further to the order of ppt.

However, in accordance with the tendency that devices become increasingly larger in size and more complicated, there have been more and more intense needs for constructing a fluid piping for gas, chemicals or the like as well as a manufacturing device for a semiconductor or the like with materials to be welded each having an oxide passivated-film with chromium oxide as a main element thereof formed thereon made by cutting a long-sized member having an oxide passivated-film with chromium oxide as a main element thereof formed thereon to a specified length, and by connecting the materials to be welded to each other by welding.

It should be noted that conventionally the member is cut with a manual pipe cutter. Then, after the material is cut, the cut edge faces are further smoothed with bite by a specific edge-face processing device (produced by Tritool) to remote burrs due to the cutting, and also the roughness of the surface is made to be fine.

The cutting and the smoothing are executed while inert gas such as $N_2$ gas or the like as purge gas is flown onto the surfaces being cut to prevent deposition of particles from outside as well as of chips generated when the material is cut onto the surfaces of the material to be welded. Especially, in a case where the material to be welded is tubular, particles from outside as well as chips generated when the material or the like is cut go into inside of the pipe and are deposited on the internal surface of the pipe, so that it is especially required that the cutting is executed while purge gas is flown inside the pipe.

(B) On the other hand, even if careful attention is paid to the matter generated when the material is cut, the oxide passivated-film is eliminated when the materials are welded, so that the surface of a welded bead section is not covered with the oxide passivated-film. For this reason, gas is easily deposited on and removed from the welded bead section, which causes the supply gas to be contaminated. Further, in not only the bead section but also in both sides of the welded bead section, chromium is volatilized, whereby chromium composition therein abruptly decreases, so that the corrosion resistance is reduced, which is the fact found by the present inventor. FIG. 1 shows the state as described above, and in the figure the state is indicated by the solid line B.

Namely, as indicated by the solid line B shown in FIG. 1, the welded bead section is set to 0, and when chrome composition is measured in both sides of the section, it can be determined that the density of chromium therein is abruptly decreased.

For this reason, when there are may joints to be welded, a quantity of out gas discharged from the joints increases to an unignorable degree, whereby the atmosphere is contaminated, and realization of a ultra-high vacuum and ultra-clean atmosphere is prevented. Also in a device and a piping system each using corrosive gas or the like, a welded section and a place adjacent to the welded section are corroded, which also causes the atmosphere to be contaminated.

For this reason, the inventor has proposed a technology different from the present invention, in which an oxide passivated-film with chromium oxide as a main element thereof is formed also on the welded section by subjecting the cut surface to chromium plating and welding, and then executing processing for formation of a passivated film while gas is flown thereonto (Japanese Patent Application No. 5438/1993).

In this technology, the plated chromium has a roll of guarding chromium from being volatilized, namely this plated chromium is oxidized by oxidizing gas due to heat generated when welding is executed, so that the chrome composition in the welded bead section as well as in a heat affected zone is prevented from decreasing, and an oxide passivated-film with chromium oxide as a main element thereof is also formed on these zones. For this reason, with this technology, it is possible to suppress the density of impurities in supply gas or an atmosphere for processing to not more than the order of ppb and further to the order of ppt even in the fluid supply piping having a welded section as well as in the manufacturing device for a semiconductor or the like.

(C) However, the present inventor has found that the problems as follows occur even in the technology described above.

(1) There is sometimes a case where an abnormally large number of particles are generated when welding is executed. Namely, as shown in FIG. 5, the problem described above has been found as a result of welding in a butt joint while back shield gas (B.S.G.) is being flown inside the tubular material to be welded (a sample) and counting generated particles with a particle counter in the downstream from the B.S.G.

The generated particles are deposited on the surface of the material to be welded, and the material is used for construction of a process device or the like as it is, then, the deposited particles on the surface is removed therefrom, for instance, when the gas is flown during formation of a film, and is brought into the atmosphere for forming the film.

(2) Also, particles go into the melting section, which causes the strength of the welded section to be reduced.

(3) It is sometimes impossible to suppress the density of impurities such as moisture or the like to the order of ppt. Namely, so far as realization of a ultra-clean atmosphere is concerned, the repeatability of this technology is not always good.

It is an object of the present invention to provide a material to be welded for butt welding which can reduce a quantity of particles going into a welded section after the welding is executed, and also to provide a method of cutting the same.

It is another object of the present invention to provide a material to be welded for butt welding which can construct a piping or a device each being capable of realizing with high-repeatability or ultra-clean atmosphere in which the density of impurities such as moisture or the like can be suppressed, and a method of cutting the same.

It is still another object of the present invention to provide a material to be welded for butt welding excellent in strength in the welded bead section and a method of cutting the same.

It is still further another object of the present invention to provide a wire used for wire cut electric discharge machining which can prevent reduction of chrome composition in a place adjacent to the welded bead section after the welding is executed.

DISCLOSURE OF THE INVENTION

In the material to be welded for butt welding according to the present invention, a surface to be butted is cut by the wire cut electric discharge machine.

The method of cutting the material to be welded for butt welding according to the present invention is characterized in that at least a surface to be butted is cut by the wire cut electric discharge machine.

The wire used for wire cut electric discharge machining according to the present invention is characterized in that at least the surface thereof is made of stainless steel or chromium.

FUNCTION

Description is made hereinafter for effects of the present invention with reference to some knowledge obtained through the process to the present invention.

(A) The present inventor performed various types of experiment on realization of the ultra-clean atmosphere described above to search the cause whey the repeatability of the atmosphere was insufficient.

One phenomenon was found in the process.

Description is made for the process. At first, an experiment was performed with a hollow pipe. A long-sized pipe with chromium oxide as a main element provided on the internal surface thereof was cut by the cutting method based on the conventional technology as described above, the edge surfaces were smoothed, then the materials each to be welded were butted to each other, and back shield gas (B.S.G.) consisting of a mixed gas of hydrogen and argon was flown inside the pipe as shown in FIG. 5. The B.S.G. was flown so that the internal pressure of the B.S.G. inside the pipe would be 100 mmAg, and as a result of measuring the internal pressure thereof after a certain period of time passed, as indicated by the line B shown in FIG. 3, the initial pressure indicated 92 mmAg, however, the pressure dropped to 85 mmAg at the morment at which the welding was started, and exceeded 100 mmAg after a while.

The present inventor examined the reason why the internal pressure of the B.S.G. dropped, and guesses that the phenomenon had occurred due to the reasons as follows. One of the reasons will be that, even if edge surfaces are butted, as shown in FIG. 4(a), when the materials are butted before welding, some force may be applied to the section to be welded when the welding is started, which may cause a position opposite to a starting position to be opened as shown in FIG. 4(b), and for this reason, the internal pressure may drop. When the position opposite side to the starting position for welding is also welded, inside of the pipe is shielded by welding, which may cause the internal pressure to go up, and this assumption may be correct because it matched with the phenomenon indicated by the line B shown in FIG. 3.

Then, it is conceivable that may particles may be generated in the manner to be welded based on the conventional technology because the particles may go into inside of the pipe when this opening is made.

If the assumption described above is correct, the opening has to be prevented, and for this reason the inventor pursued for the means for solving the problem. Because it was entirely unknown what was the cause for the phenomenon of opening, the inventor performed experiments under various conditions for welding as well as for clamping a material to be welded or the like, but any significant effect over the phenomenon could not be found. Then, considering that the phenomenon might have something to do with a cut surface, the inventor performed on an experiment, at first, with surface roughness of an edge face changed on a trial basis. Namely, after the material was cut by means of the method based on the conventional technology, the cut surface of the material was smoothed with bite to prepared samples having three types of surface roughness respectively such as (a) $R_a$=1500 nm, (b) $R_a$=650 nm, (c) $R_a$=500 nm, and the surfaces were butted to each other for being welded, whereby an experiment was performed, as a result, any significant difference among the three types thereof was not recognized. Namely, it was found that the fact that the surface roughness ($R_a$) was fine could not always prevent the generation of opening (the phenomenon is checked by dropping of the internal pressure). Eventually, it was found that the surface roughness ($R_a$) was not always a dominant element for the phenomenon.

Then, as a result of experiments performed by the present inventor to check various types of cutting method, it was found that a drop of the internal pressure in the B.S.C. hardly occurred in the initial stage of the welding process in a case where the material was cut by the wire cut electric discharge machining. Not only was it found, but also it was found that the internal pressure achieved 100 mmAg in the butted state of the members. The state is indicated by the line A shown in FIG. 3.

It is conceivable that this state is generated because the edge faces are completely shielded and absorption force between the faces is sufficiently strong.

Namely, in a case where the faces of the material cut by the wire cut electric discharge machining are butted to each other, the butted faces are not opened even in any portion other than the starting position for welding at the moment when the welding is started, and the entire surfaces are shielded. For this reason, deposition of particles onto the surface thereof can be prevented.

Also, entry of particles into the bead section can be prevented, which makes it possible to obtain high strength in the butted joint.

(B) On the other hand, it was found that the bead section was not flat with pits and projections occurred thereon when the opening occurred therein.

Then, the pits and projections found thereof each became a dead space for a fluid, which prevented the fluid from flowing smoothly. This phenomenon causes contamination of the supply fluid as a whole. It can be considered that this mechanism will be obstacle to realize a ultra-clean atmosphere for forming a film with high repeatability.

On the contrary, in a case where a material is cut with the wire by wire cut electric discharge machining, generation of the opening can be prevented, and as a result, a flat bead section with few pits and projections thereon can be obtained, which makes it possible to eliminated a dead space thereon. Consequently, it is possible to supply a ultra-clean fluid as well as to realize a ultra-clean atmosphere for forming a film each free from any contamination.

(C) Also it was found that the cut faces of the material cut by wire cut electric discharge machining are excellent in the characteristics enabling deposition of chromium on the surface thereof as compared to that on the face cut by the method based on the conventional technology.

Namely, it is found that chromium is not always iniformly deposited on the face cut by the method based on the conventional technology. The material was cut by the method based on the conventional technology and the faces were welded after being subjected to chromium plating. Then the inventor developed, separately from the present invention, the technology in which an oxide passivated-film with chromium oxide as a main element thereof was formed on the welded bead section by passivating the faces while oxidizing gas was flown onto the face and also reduction of chrome composition in the heat affected zone was prevented, however, the face that the density of impurities in the face can not sometimes be reduced to the order of ppt even with this technology is as described in the column of related technology. The inventor has made it clear that the reason described above is derived from the fact that chromium is not always uniformly deposited on the face cut by the conventional type of cutting method.

However, the material to be welded having a face cut with the wire by wire cut electric discharge machining has such an effect that the material can have chromium uniformly deposited on the cut face. For this reason, in a case where welding is executed while oxidizing gas is flown onto the face, it is possible to form an oxide passivated-film with chromium oxide on a welded bead section, consequently, a ultra-clean atmosphere can be realized with high repeatability.

(D) As an edge face cut with the wire is excellent in smoothness and straightness, it is extremely easy to butt materials to be welded to each other (in a case of pipes, central axes are easily butted), so that it is also possible to achieve other effect that a period of time required for a series of processes from cutting to welding can be reduced to about ⅓ as compared to that based on the conventional technology.

EMBODIMENTS EXAMPLES

It is preferable that at least the surface of a wire used for a wire cut electric discharge machine is made of stainless steel or chromium. The stainless steel containing chromium therein by not less than 20 percentage by weight is preferable, and SUS316L is one of the preferable example.

The inventor has found that, when the surface of the wire is made of stainless steel or chromium, some chromium is deposited on the cut edge face of the material to be welded after the cutting is executed. In addition, it is found that a rate of the deposition of chromium thereon is not less than 0.1 $\mu$m which is sufficient for forming an oxide passivated-film with chromium oxide as a main element thereof on the bead section as well as for preventing reduction of chrome composition in the heat affected zone adjacent to the bead section. This fact is a reason whey at least the surface of the wire used for the wire cut electric discharge machine should preferably be made of stainless steel or chromium.

As described above, the fact that it is possible to form an oxide passivated-film with chromium oxide as a main element thereof on the bead section as well as to prevent reduction of chrome composition in the heat affected zone adjacent to the bead section if at least the surface of the wire used for the wire cut electric discharge machine is made of stainless steel or chrome, shows that it is possible to obtain such a large effect that disadvantageous extra processes such as plating or the like can be eliminated.

It should be noted that formation of an oxide passivated-film with chromium oxide as a main element thereof on the bead section may be executed by subjecting the faces to passivating while oxidizing gas is flown under a specified temperature for heating after the welding is executed, or may be executed by flowing chromium oxide as B.S.G. onto the faces when the welding is executed.

The present invention is more effective in a case where the material to be welded is tubular, and further more effective in a case where the outer diameter thereof is not mot more than ¼ inch (6.35 mm).

In a case where the material to be welded is a pipe, alignment of two pipes is difficult and he opening can easily occur because an area in which the edge faces are contacted with each other obtained when the materials to be welded are butted to each other is smaller than that in a case where the material is a solid. However, in the present invention, the alignment of two pipes can easily be made and generation of the opening can sufficiently be prevented even if the outer diameter of the pipe is not more than ¼ inch (6.35 mm) and the wall thicknessthereof is 1 mm.

As a welding means for the present invention, for instance, a means with electric discharge or with a laser is used. As a means with electric discharge, tungsten inert gas welding and arc gas welding or the like can be taken up as the example.

The process device according to the present invention indicates a manufacturing device for a semiconductor, a manufacturing device for a super-conductive thin film, a manufacturing device for a magnetic thin film, a manufacturing device for a metallic thin film, and a manufacturing device for a derivative thin film or the like, and more specifically, a spattering device, a vacuum depositing device, and a device for forming a film as well as a processing device using CVD, PCVD, MOCVD, MBE, dry etching, ion implantation, a diffusion/oxide furnace or the like, and also an evaluating device using such as Auger electron spectrum, XPS, SIMS, RHEED, and TREX or the like. A piping system for supplying gas to any of the devices described above as well as manufacturing and supplying device for ultra-pure water are also included in the process device according to the present invention.

As a material to be welded, any of ferric stainless steel, austenite stainless steel, two-phase stainless steel is used. Especially, SUS316L is preferable.

BRIEF DESCRIPTION OF THE DRAWINGS

FIG. 4 is a sectional side view of the material to be welded showing changes of a butted face during the welding;

FIG. 6 is a graph showing composition in a direction of the thickness of the material to be welded cut by the cutting method based on the conventional technology after the welding is executed.

BEST MODE FOR CARRYING OUT THE PRESENT INVENTION

Figure 1:
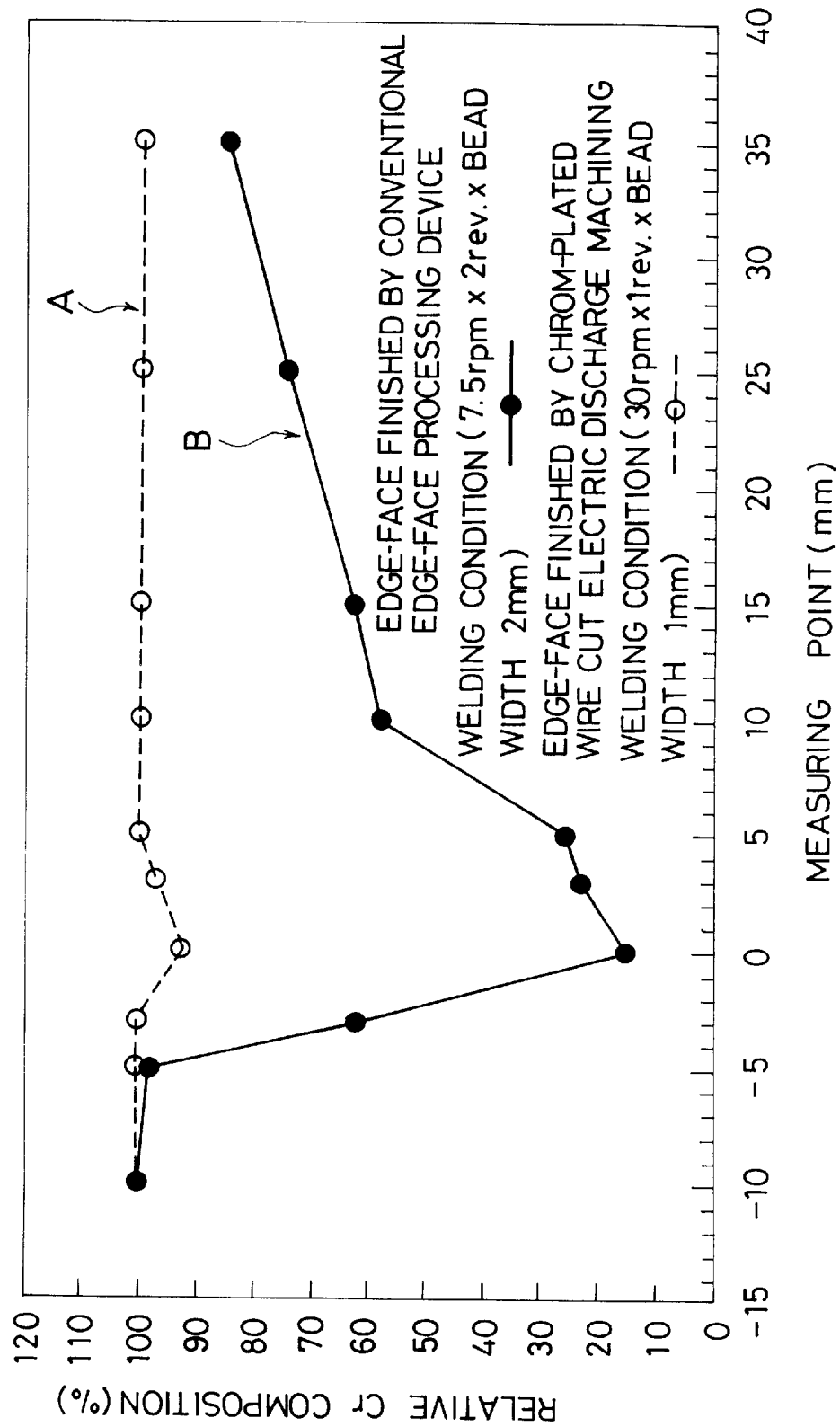
FIG. 1 is a graph showing Cr composition in the top layer section after welding is executed.

Next description is made for an embodiment of the present invention with reference to FIG. 1.

Embodiment 1

There was prepared a SUS316L pipe having a diameter of ¼ inch in which a chromium oxide passivated-film with chromium as a main element thereof was formed on the internal surface of a long-sized tube.

The tube was cut in a specified length by wire cut electric discharge machining in which a wire was previously chrome-plated to be tubular materials to be welded.

As a result of measuring a film thickness of chromium deposited on the edge surface of this tubular material to be welded after the welding was executed by means of XPS (X-ray photoelectron Spectrum), it was found that the film thickness was about 0.1 $\mu$m.

Figure 3:
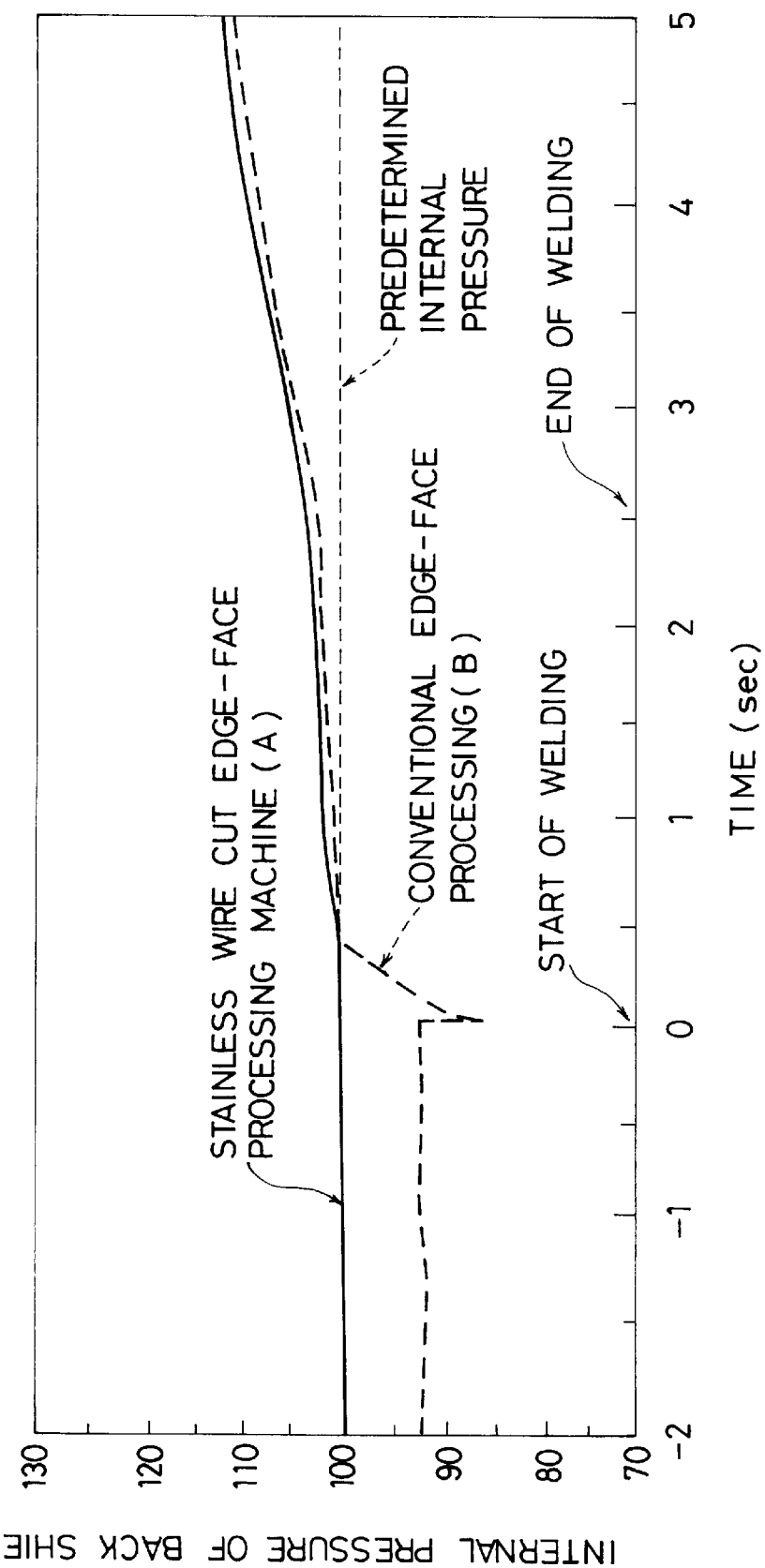
FIG. 3 is a graph showing changes in pressure in welding back shield gas.
Figure 5:
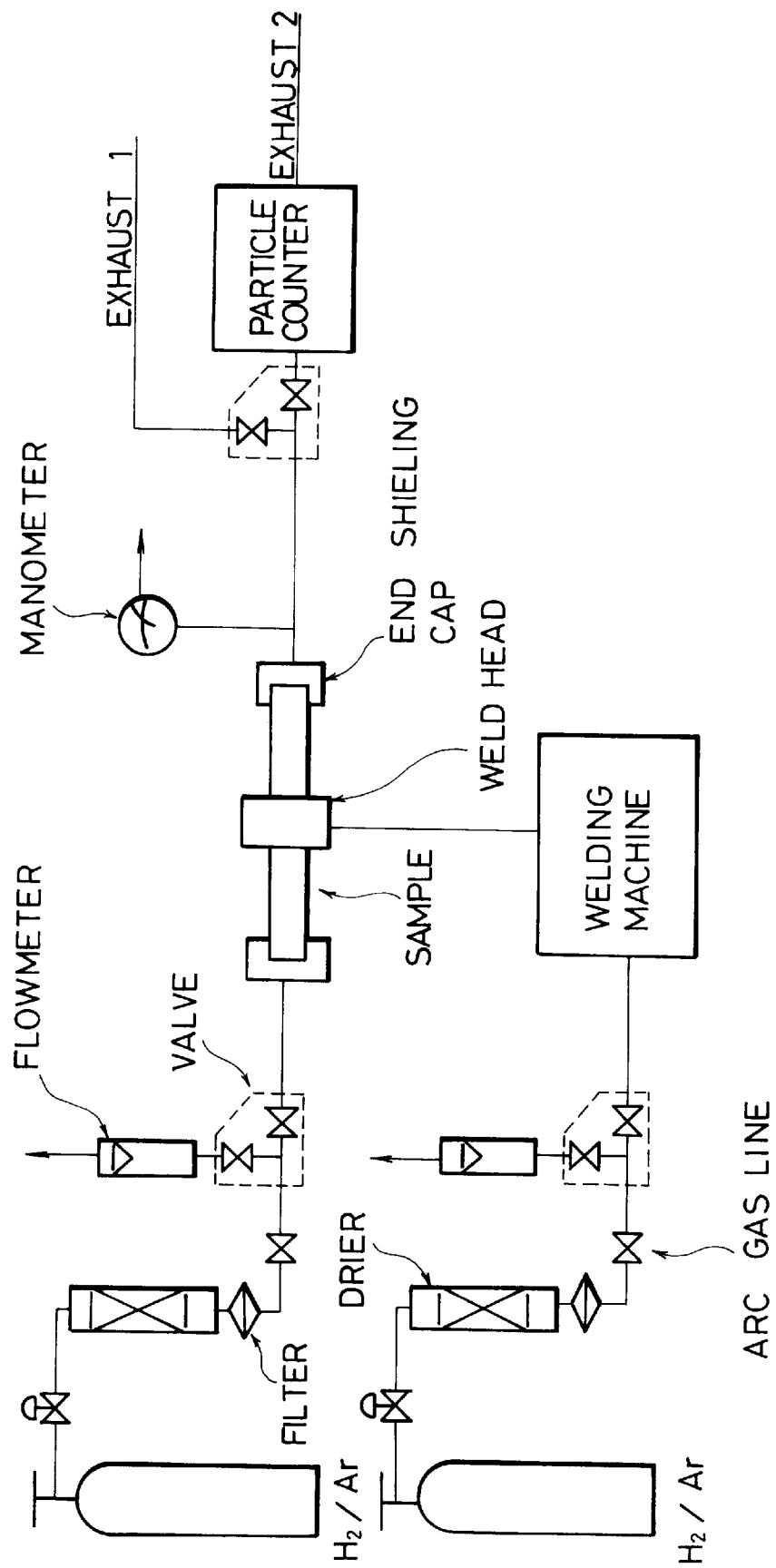
FIG. 5 is a conceptional view showing a method of welding.

Then, the cut tubular materials to be welded were butt-welded to each other with the tungsten inert gas welding method. As for the welding conditions, the tube was welded in a cycle at a welding speed of 1 cm/sec and a width of the bead section was adjusted to 2 mm. Ar gas containing therein $H_2$ gas was used as back shield gas during welding. FIG. 5 shows the experimental method. Internal pressure of the back shield gas (B.S.G.) was recorded in a recorder through a pressure sensor. The initial pressure before the welding was executed was set to 100 mmAg. FIG. 3 shows a relation between internal pressure of the BSG and a time in a range from the time immediately before the welding was executed until the time after the welding was executed. The obtained samples of the welded pipe were classified as follows. B: a sample (indicating B shown in FIG. 1) which was subjected to edge-face processing with the edge-face processing device based on the conventional technology (produced by Tritool), and A: a sample (indicating A shown in FIG. 1) in which chromium was deposited on the edge face due to electric discharge. In the edge-face pressing method indicated by (B), the internal pressure showed 29 mm Ag when the material was set. The pressure was found to instantaneously drop until 85 mm Ag during electric discharge for welding, then, the pressure increased more and more in accordance with rising temperature in the welded section. On the other hand, in the method of (A), the pressure showed 100 mmAg, at a point of time when the material was set, which was the same value as the initial one, and it was found that the pressure never dropped even when the welding was started.

After the welding was finished, a rate of chrome composition in the most outer surface was checked in a range from the upstream by 100 mm from the welded bead section to the downstream by 35 mm therefrom to the flow of the back shield gas. FIG. 1 shows the result obtained by the checking. The X-axis in FIG. 1 indicates measuring points, and the Y-axis indicates a ratio of a detected rate of chromium to an entire detected rate of Fe, Cr, Ni, and Mn.

As clearly understood from FIG. 1, the reduction of the composition rate of Cr in the bead section of a sample with chromium deposited on the edge face thereof was suppressed by about 10% to the background level. Namely a composition rate of Cr in the place adjacent to the welded bead section is substantially equivalent to that in the most outer surface of the base material.

Figure 2:
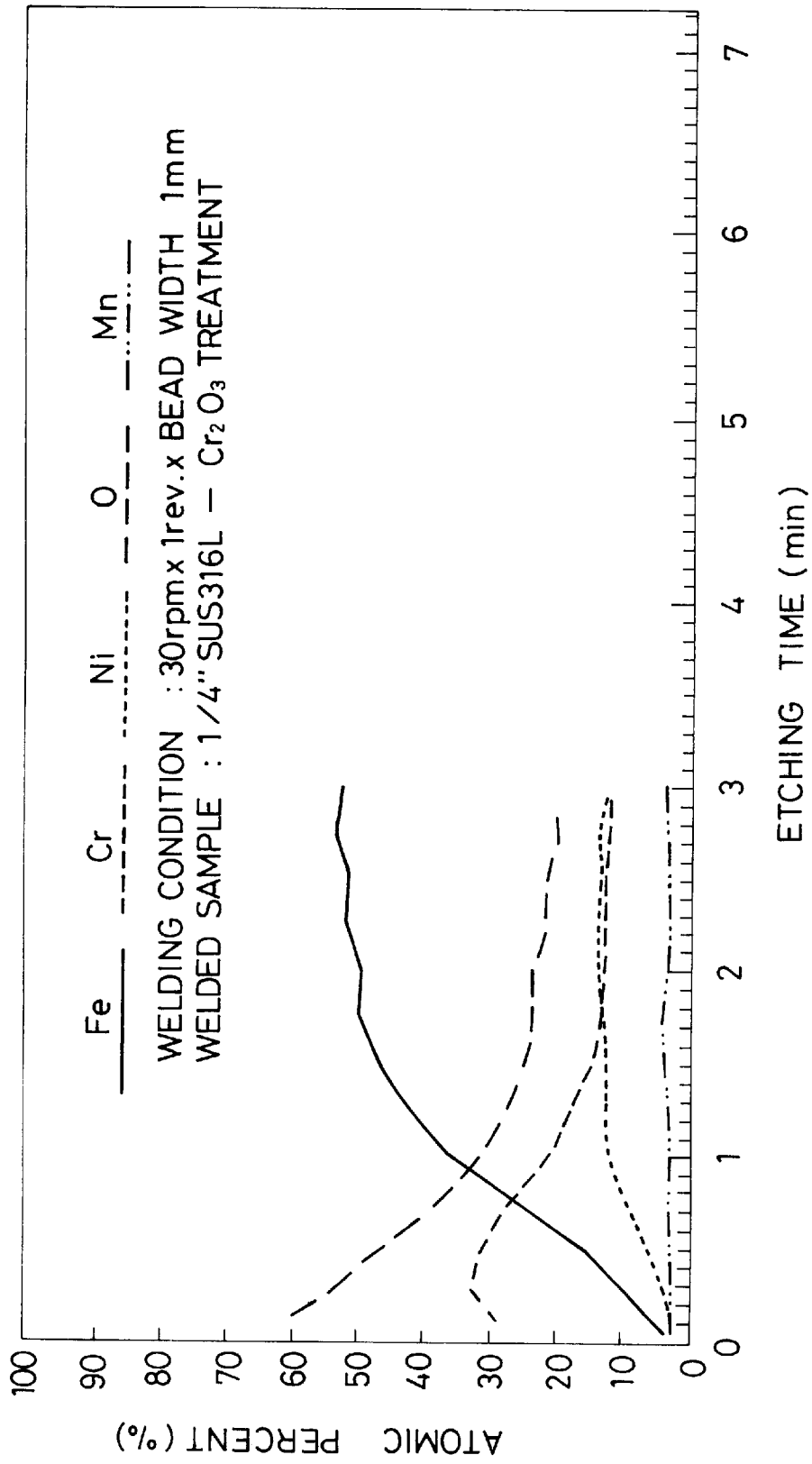
FIG. 2 is a graph showing composition in a direction of the thickness of a welded bead section after the material to be welded cut by wire cut electric discharge machining is welded.

The pipe was cut after the welding was finished and a distribution of the composition in a depth direction of the surface of the welded section was measured with the XPS. FIG. 2 shows a result of the measurement. In FIG. 2, the Y-axis indicates a composition ratio of atoms in the distribution, and the X-axis indicates an etching time or the surface by spattering. An etching time for one minute corresponds to a film thickness of about 10 nm to be etched.

As clearly understood from FIG. 2, in a case where a material to be welded with chromium deposited on the edge face of the welded section thereof is welded, it is found that an oxide passivated-film containing therein a large amount of chromium is formed on the welded section.

As a result of measuring a rate of particles by a particle counter, a case of the sample (B) had a rate of particles much less as compared to that of (A).

Then, HCl gas containing therein moisture of 300 ppm was filled in the welded pipe with 5 $Kg/cm^2$ of pressure and left as it was for 24 hours. Then, the pipe was cut to observe the internal surface thereof, and as a result, corrosion was recognized on the surface of the welded section in the sample (B), while corrosion was not recognized at all on the sample of (A) like that on the non-welded section, so that it is found that an oxide passivated-film excellent in corrosion resistance is formed on the surface with the welding method according to the present invention.

INDUSTRIAL APPLICABILITY

As described above, if a material is cut by electric discharge machine with a wire subjected to chromium plating according to the present invention when the material to be welded is to be cut, it is possible to deposit chromium on edge faces of the material simultaneously when the material is cut.

When butt welding is executed to the materials as described above, a welded bead section with a thick chromium or a thick chromium oxide film can be subjected to passivation, which makes it possible to provide an ultra-high-clean process device, a supply piping system for ultra-high purity gas, and a manufacturing device for ultra-pure water.

Another big advantage in the cutting by this wire cut electric discharge machining is to largely reduce a period of time required for the cutting as well as edge-face processing. A series of processed based on the conventional technology such as cutting, edge-face processing, removing internal burrs as well as external burrs can be executed by one process. Accordingly, the time reduction by around ⅓ with the present invention can be expected as compared to that with the conventional type of method.

I claim:

1. A material to be welded for butt welding, wherein at least a butted surface thereof is cut by a wire of a wire cut electric discharge machine; and at least a surface of said wire being one of stainless steel and chromium.

2. The material to be welded for butt welding according to claim 1 wherein a chromium oxide passivated-film with said chromium as a main element thereof is formed on the surface of said material to be welded before the material is cut.

3. The material to be welded for butt welding to claim 1 wherein said stainless steel or said chromium each with a thickness of not less than 0.1 um is deposited on said butted surface as said butted is surface cut by the wire.

4. The material to be welded for butt welding according to claim 1 wherein said material to be welded is tubular.

5. The material to be welded for butt welding according to claim 4 wherein an outer diameter of said tubular material to be welded is not more than 6.35 mm.

6. A method of cutting a material to be welded for butt welding; wherein at least a butted surface is cut by a wire of a wire cut electric discharge machine wherein at least a surface of the wire being one of stainless steel and chromium.

7. The method of cutting a material to be welded for butt welding according to claim 6 wherein said material to be welded is tubular.

8. The method of cutting a material to be welded for butt welding according to claim 7 wherein an outer diameter of said tubular material to be welded is not more than 6.35 mm.

9. A method for butt welding wherein at least a butted surface thereof is cut by a wire electric discharge machine using a wire having at least a surface of the wire being one of stainless steel and chromium; and the cut surfaces are butted to each other to be welded.

10. The method for butt welding according to claim 9; wherein the welding is executed while back shield gas is flown in a place adjacent to the welded section.

11. The method for butt welding according to claim 9 wherein said back shield gas is oxidizing gas or gas containing therein oxidizing gas, and an oxide passivated-film with chrome as a main element thereof is formed on a welded bead section simultaneously when the welding is executed.

12. The method for butt welding according to claim 11 wherein said material to be welded is tubular.

13. The method for butt welding according to claim 12 wherein an outer diameter of said tubular material to be welded is not more than 6.5 mm.

14. A wire used for wire cut electric discharge machining wherein at least the surface of the wire is made of stainless steel or chromium.

15. A wire used for the wire cut electric discharge machining wherein a stainless steel layer or a chromium layer is formed on a surface of a base of said wire made of elements other than stainless steel or chromium.

16. A fluid supply piping system constructed by cutting at least a surface to be butted of a material to be welded with a wire of a wire cut electric discharge machine wherein at least a surface of the wire being one of stainless steel and chromium; and welding said cut surfaces thereof in a butted state.

17. A process device constructed by cutting at least the surface to be butted of a material to be welded with a wire cut electric discharge machine using a wire having at least a wire surface being one of stainless steel or chromium and welding said cut surfaces thereof in a butted state.

* * * * *